(12) United States Patent
Sana

(10) Patent No.: US 9,969,106 B2
(45) Date of Patent: May 15, 2018

(54) MOLD

(75) Inventor: Toshikazu Sana, Kakamigahara (JP)

(73) Assignee: KAWASAKI JUKOGYO KABUSHIKI KAISHA, Kobe-shi (JP)

( * ) Notice: Subject to any disclaimer, the term of this patent is extended or adjusted under 35 U.S.C. 154(b) by 1328 days.

(21) Appl. No.: 13/976,871

(22) PCT Filed: Dec. 26, 2011

(86) PCT No.: PCT/JP2011/007256
§ 371 (c)(1),
(2), (4) Date: Sep. 9, 2013

(87) PCT Pub. No.: WO2012/090469
PCT Pub. Date: Jul. 5, 2012

(65) Prior Publication Data
US 2013/0344315 A1 Dec. 26, 2013

(30) Foreign Application Priority Data
Dec. 27, 2010 (JP) .................. 2010-290402

(51) Int. Cl.
*B29C 33/42* (2006.01)
*B29C 70/42* (2006.01)
(Continued)

(52) U.S. Cl.
CPC .......... *B29C 33/42* (2013.01); *B29C 33/3828* (2013.01); *B29C 70/42* (2013.01);
(Continued)

(58) Field of Classification Search
None
See application file for complete search history.

(56) References Cited

FOREIGN PATENT DOCUMENTS

| DE | 102009020190 | * 9/2010 |
| JP | 5-131555 A | 5/1993 |

(Continued)

OTHER PUBLICATIONS

Stewart ("New Technologies and Tooling Materials Promise Advances for Composites", Reinforced Plastics, vol. 54, iss. 3, May-Jun. 2010, pp. 30-36).*

(Continued)

*Primary Examiner* — Shawn Mckinnon
(74) *Attorney, Agent, or Firm* — Sughrue Mion, PLLC

(57) ABSTRACT

A mold (100) according to the present invention is a mold used when curing a cylindrical laminate (30) obtained by laminating prepreg. The mold (100) includes a core die (10) located inside the laminate (30) and a surface die (20) that is located outside the laminate (30) and includes a plurality of partial surface dies (21 to 27). The partial surface dies (21 to 27) are arranged in a circumferential direction of the laminate (30) so as to cover the entire circumferential surface of the laminate (30). Each of the partial surface dies (21 to 27) is made of a fiber-reinforced resin in which a quantity of fiber having a grain direction in agreement with the circumferential direction differs from a quantity of fiber having a grain direction in agreement with an axial direction. Each of the partial surface dies (21 to 27) is constructed so that a coefficient of thermal expansion in the circumferential direction approximates a coefficient of thermal expansion of the core die (10) as compared with a coefficient of thermal expansion in the axial direction.

5 Claims, 2 Drawing Sheets

(51) Int. Cl.
*B29C 33/38* (2006.01)
*B29L 23/00* (2006.01)
*B29C 33/48* (2006.01)
*B29L 31/30* (2006.01)
*B29C 33/40* (2006.01)

(52) U.S. Cl.
CPC ............. *B29C 33/40* (2013.01); *B29C 33/48* (2013.01); *B29L 2023/00* (2013.01); *B29L 2031/3082* (2013.01); *Y10T 29/49718* (2015.01); *Y10T 428/249921* (2015.04)

(56) References Cited

FOREIGN PATENT DOCUMENTS

| | | | |
|---|---|---|---|
| JP | H07299829 | * | 11/1995 |
| JP | 2002-212310 | A | 7/2002 |
| JP | 2004-276478 | A | 10/2004 |
| JP | 2009-526697 | A | 7/2009 |
| WO | 2007/093636 | A1 | 8/2007 |

OTHER PUBLICATIONS

Machine translation fo Kasai et al. JPH07299829.*
Machine translation of DE102009020190.*

* cited by examiner

[FIG. 1]
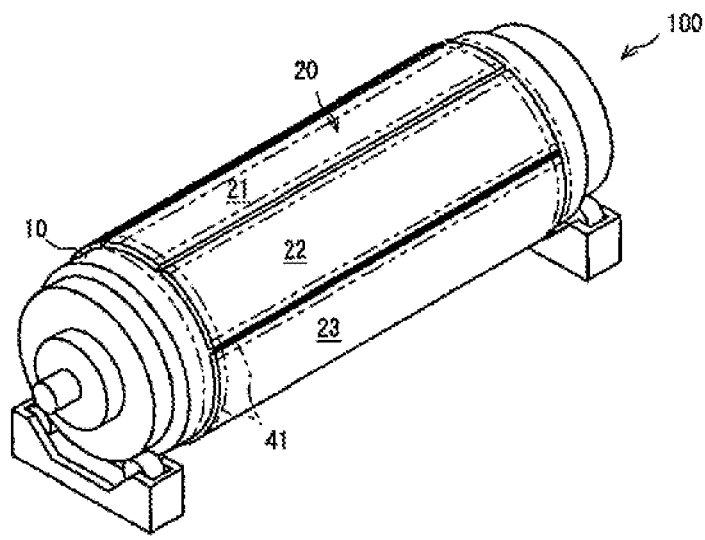
[FIG. 2]
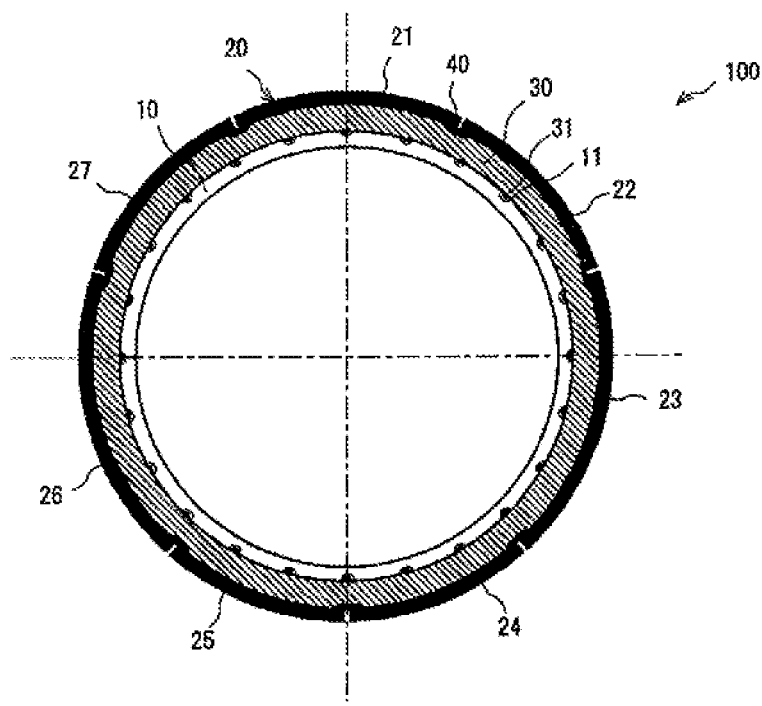

[FIG. 3A]
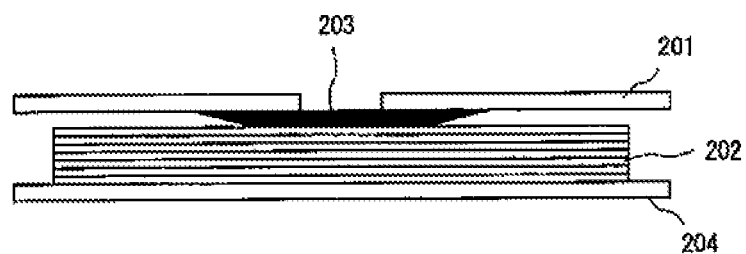
[FIG. 3B]
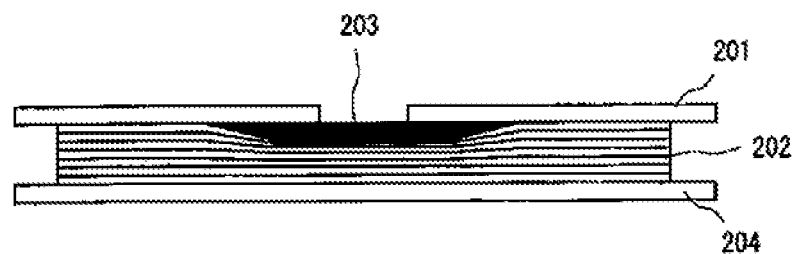
[FIG. 3C]
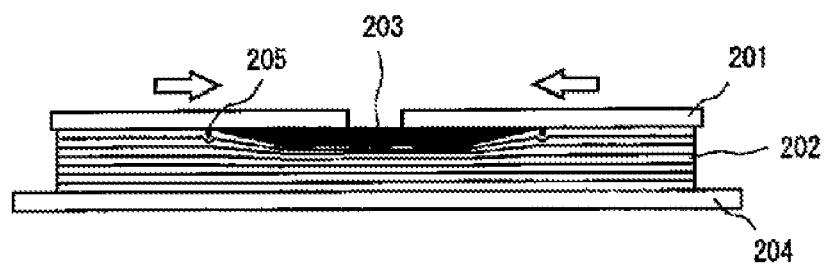

MOLD

CROSS REFERENCE TO RELATED APPLICATIONS

This application is a National Stage of International Application No. PCT/JP2011/007256 filed Dec. 26, 2011, claiming priority based on Japanese Patent Application No. 2010-290402 filed Dec. 27, 2010, the contents of all of which are incorporated herein by reference in their entirety.

TECHNICAL FIELD

The present invention relates to a mold used for manufacturing a composite material molded article.

BACKGROUND ART

A skin of a fuselage of an aircraft is constructed of a thin member called a skin panel (for example, refer to Patent Document 1). In recent years, a technology for integrally forming a broader skin panel than before with using fiber-reinforced resin composite materials (hereinafter, simply referred to as "composite materials") has been developed. For example, even though a skin panel in the vicinity of the center of the fuselage of a large aircraft has a cylindrical shape, the technology integrally forms a seamless skin panel of a cylindrical shape.

In order to manufacture the skin panel of a cylindrical shape described above, prepreg is laminated onto an outside surface of a cylindrical core die (generally called a "mandrel"), and the laminated prepreg (hereinafter, referred to as a "laminate") has a cylindrical shape overall. "Prepreg" is a sheet-shaped material prepared by impregnating a textile such as carbon fiber, or a unidirectional material including carbon fiber and the like with a semi-cured thermosetting resin (epoxy resin, etc.). Then, the laminate is put under pressure and heat to be cured. At the time of curing, a plate-like surface die (generally called a "curl plate") which has a smooth surface is brought into tight contact with the surface of the laminate so that the smooth surface of the surface die will be transferred, molding the skin panel with a smooth surface. The surface is smoothed for the reason that the outside surface of the skin panel comes into contact with an air current, and high smoothness is required.

However, since the skin panel of a large aircraft has a considerably large diameter of 5 to 10 m, it is substantially impossible to perform molding with a single surface die. Therefore, actually, a plurality of partial surface dies having an inner surface of a circular-arc sectional shape (i.e., the shape of a partial circle in section) is assembled to construct a mold. However, in the case of constructing a mold with a plurality of partial surface dies, since a thermosetting resin temporarily exhibits a viscosity drop due to the heat at the time of curing a laminate, there is a problem that an edge of the partial surface die is pressed against the laminate, thereby intruding into the laminate.

As a measure for this problem, a method of using a connecting member (generally called a "pre-cured strip") which is a composite material cured in advance is proposed. That is, as shown in FIG. 3A, a connecting member 203 is inserted between a partial surface die 201 and a laminate 202 so as to correspond to a joint between the partial surface dies 201, and is then put under pressure and heat so as to be cured. Through this method, as shown in FIG. 3B, since the connecting member 203 intrudes into the laminate 202, a portion corresponding to the joint between the partial surface dies 201 is smoothed. In this case, since the connecting member 203 is cured in advance and is rigid, the partial surface die 201 does not intrude into the connecting member 203.

PRIOR ART DOCUMENT

Patent Document

Patent Document 1: PCT Application Publication No. 2009-526697

SUMMARY OF THE INVENTION

Problems to be Solved by the Invention

As the material of the surface die it is preferred to use composite materials for the reason that the composite materials hardly undergo a local deformation and easily return to their original shapes even if they are locally deformed. In contrast, as the material of the core die, it is preferred to use metals which allow easy maintenance, hardly undergo thermal deterioration, and have long durability. When different materials are chosen for the core die and the partial surface die, respectively, for the above reason, a new problem arises. The problem will be described with reference to FIG. 3C. For example, when a core die 204 is made of an invar alloy having a low thermal expansion and a partial surface die 201 is made of a composite material, under application of heat of a high temperature, the partial surface die 201 expands far more greatly than the core die 204 due to a difference in coefficient of thermal expansion between them. When the partial surface die 201 pulls the surface of the laminate 202 in a circumferential direction, toward the connecting member 203 due to the difference in thermal expansion amount between the partial surface die 201 and the core die 204, wrinkles 205 occur on both sides of the connecting member 203. When the wrinkles 205 have a deep depth, the strength of a skin panel decreases. This may cause a breakage of the skin panel.

The present invention was made to solve the above-mentioned problems and an object thereof is to provide a mold which hardly allows wrinkles to occur at the time of curing a laminate obtained by laminating prepreg.

Solutions to the Problems

The present invention was made to solve the above-mentioned problems, and a mold according to the present invention is a mold used when curing a cylindrical laminate obtained by laminating prepreg. The mold includes a core die located inside a laminate, and a surface die that is located outside the laminate and includes a plurality of partial surface dies, the partial surface dies being arranged in a circumferential direction of the laminate so as to cover the entire circumferential surface of the laminate, each of the partial surface dies being formed of a fiber-reinforced resin in which a quantity of fiber having a grain direction in agreement with a circumferential direction differs from a quantity of fiber having a grain direction in agreement with an axial direction, and each of the partial surface dies being constructed such that a coefficient of thermal expansion in the circumferential direction more closely approximates a coefficient of thermal expansion of the core die than a coefficient of thermal expansion in the axial direction. In accordance with this configuration, since the coefficient of thermal expansion in the circumferential direction of each partial surface die approximates the coefficient of thermal expansion in the circumferential direction of the core die, it is possible to suppress wrinkles attributable to a difference between both the coefficients of thermal expansion from occurring.

In the mold, the core die may be made of an invar alloy, and each of the partial surface dies may be constructed such that the quantity of the fiber having the grain direction in agreement with the circumferential direction is larger than the quantity of the fiber having the grain direction in agreement with the axial direction. In accordance with this configuration, although the coefficient of thermal expansion of the core die is low because the core die is made of the invar alloy, it is possible to make the coefficient of thermal expansion of the partial surface die in the circumferential direction approximate the coefficient of thermal expansion of the core die by controlling a ratio of the quantity of the fiber having the grain direction in agreement with the circumferential direction and the quantity of the fiber having the grain direction in agreement with the axial direction.

In the mold, it is desirable for the quantity of the fiber having the grain direction in agreement with the axial direction to be 1 and for the quantity of the fiber having the grain direction in agreement with the circumferential direction to be 2 to 5. In accordance with this configuration, the partial surface die may have a strength required for application as well as a low coefficient of thermal expansion in the circumferential direction. Furthermore, the coefficient of thermal expansion can be controlled.

In the mold, the partial surface die may be formed by laminating a unidirectional material in which contained fiber has a grain direction in agreement with only the circumferential direction and a textile material in which some contained fiber has a grain direction in agreement with the circumferential direction and the remaining contained fiber has a grain direction in agreement with the axial direction, in a predetermined ratio. In accordance with this configuration, the partial surface die where the quantity of the fiber having the grain direction in agreement with the circumferential direction is larger than the quantity of the fiber having the grain direction in agreement with the axial direction can be easily manufactured.

In the mold, within the laminate, a strength margin obtained by subtracting a requisite thickness for a required strength from an actual thickness varies from position to position in the circumferential direction, and each partial surface die is arranged so that a joint between the partial surface dies may be located in a position in the circumferential direction, the position having the strength margin larger than that of the periphery. In accordance with this configuration, since the joints between the partial surface dies are located in the positions where the strength margin is relatively large within the laminate, even if a little bit of wrinkles occur in a position corresponding to a boundary between the partial surface dies, influence of a decrease in the strength of the laminate may be suppressed to an insignificant level.

In the mold, within the laminate, a strength margin obtained by subtracting a requisite thickness for a required strength from an actual thickness varies from position to position in the circumferential direction, and each partial surface die may be arranged so that one of joints between the partial surface dies may be located in a position disposed in the circumferential direction, where the strength margin is the largest among positions within the laminate. In accordance with this configuration, even if wrinkles occur within the laminate, if the strength margin is sufficiently large at the position, an effect of a decrease in the strength of the laminate may be suppressed to an insignificant level.

In the mold, the laminate may be formed as a fuselage of an aircraft, the surface die may include 5 to 8 sheets of the partial surface die, and the partial surface dies may be bilaterally symmetrically arranged with respect to a portion located at a top portion of the fuselage. In accordance with this configuration, since the partial surface dies are formed in a suitable size, it is easy to handle the partial surface dies.

A coefficient-of-thermal-expansion adjustment method according to the present invention is a method of adjusting a coefficient of thermal expansion of a member that is made of a fiber-reinforced resin, and adjusts a coefficient of thermal expansion in a predetermined direction by increasing or decreasing a quantity of fiber having a grain direction in agreement with the predetermined direction. The member according to the present invention is a member made of a fiber-reinforced resin which is adjusted through the coefficient-of-thermal-expansion adjustment method.

Effects of the Invention

As described above, in accordance with a mold according to the present invention, since a coefficient of thermal expansion of each partial surface die in a circumferential direction approximates a coefficient of thermal expansion of a core die, when curing a laminate obtained by laminating prepreg, wrinkles hardly occur.

BRIEF DESCRIPTION OF THE DRAWINGS

FIG. 1 is a perspective view of a mold according to an embodiment of the present invention.

FIG. 2 is a cross-sectional view of the mold according to the embodiment of the present invention.

FIG. 3A is an enlarged cross-sectional view of a boundary between partial molds in a conventional mold.

FIG. 3B is an enlarged cross-sectional view of a boundary between partial molds in a conventional mold.

FIG. 3C is an enlarged cross-sectional view of a boundary between partial molds in a conventional mold.

EMBODIMENTS OF THE INVENTION

Hereinafter, embodiments of a mold according to the present invention will be described with reference to the drawings. Hereinafter, throughout the drawings, the same or corresponding components are designated by the same reference numerals and repetitive description thereof will not be given.

<Outline of Mold>

First, an outline of a mold 100 according to the present embodiment is described with reference to FIGS. 1 and 2. The mold 100 according to the present embodiment is used for molding a skin panel of a fuselage of a large aircraft. The skin panel is assumed to have a cylindrical shape having a diameter of about 6 m and an axial length of about 7 m. FIG. 1 is a perspective view showing a state in which the mold 100 according to the present embodiment is being used. FIG. 2 is a cross-sectional view of a structure in which a surface die 20 according to the present embodiment is attached to a laminate 30. As shown in FIG. 1, the mold 100 according to the present embodiment includes a core die 10 and the surface die 20. Hereinafter, each of these constituent components will be described in order.

The core die 10 is a die located inside the laminate (which becomes a skin panel as a molded article after curing) 30 which is obtained by laminating prepreg. As described above, the core die 10 is called a "mandrel" in general. As shown in FIGS. 1 and 2, the core die 10 according to the present embodiment has a cylindrical shape and is constructed to be rotatable. The core die 10 is excellent in thermal endurance, and is made of an invar alloy which has a characteristic of a low thermal expansion. Herein, the term "invar alloy" means an alloy containing 34 to 36% nickel and the remaining balance iron. The invar alloy is a metal that exhibits extremely low thermal expansion. The coefficient of thermal expansion (CTE) of the invar alloy is about 2.0 to $2.5 \times 10^{-6}/°$ C. As shown in FIG. 2, a groove 11 which extends in an axial direction is formed in the surface of the core die 10, and a stringer 31 made from prepreg is inserted in the groove. The stringer 31 is a bar-like reinforcing member which receives a bending load acting in an axial direction of a fuselage of an aircraft, and is integrally formed with the skin panel so as to form a so-called one-piece barrel (OPB).

The surface die 20 is a die located outside the laminate (which becomes a skin panel as a molded article after curing) 30 which is obtained by laminating prepreg. As described above, the surface die 20 is called a "curl plate" in general. As shown in FIG. 2, the surface die 20 according to the present embodiment is constructed of partial surface dies 21 to 27 of seven sheets, and the partial surface dies 21 to 27 are arranged in a circumferential direction of the laminate 30 so as to cover the entire surface of the laminate 30. In other words, the surface die 20 is divided into the partial surface dies 21 to 27 of seven sheets. As the partial surface die, one that has a high rigidity and fixed shape (i.e., one having an inner circumferential surface whose sectional shape is a circular-arc shape) is generally used, but in the present embodiment, one that originally has a flat plate shape and is elastically deformable into a curved shape from the flat plate shape is used. The details of the partial surface dies 21 to 27 are described later.

Here, a method of molding the skin panel as a molded article is described. First, the stringer 31 is buried in the groove 11 formed in the surface of the core die 10, and the core die 10 is rotated in this state. While the core die 10 is being rotated, prepreg is laminated on the surface of core die 10 to form the laminate 30 of a cylindrical shape as a whole. The number of sheets of the prepreg laminated varies from position to position. For example, about twelve sheets of the prepreg may be laminated in a certain portion, and about 100 sheets of the prepreg may be laminated in a portion corresponding to an opening (e.g., a portion where a door is supposed to be installed) at which an extreme strength decrease is exhibited for the reason of need of reinforcing.

Next, the partial surface dies 21 to 27 are attached on the surface of the laminate 30 so as to be arranged in a circumferential direction. At this time, as shown in FIG. 2, connecting members (pre-cured strips) 40 are inserted between each of the partial surface dies 21 to 27 and the laminate 30 in positions corresponding to joints between the partial surface dies 21 to 27. Next, as indicated by a chain double-dashed line in FIG. 1, a belt-like bag film 41 is pasted onto the joints between the partial surface dies 21 to 27 to seal the laminate 30, and then vacuum suction is performed. Then, the core die 10 and the surface die 20 are entirely covered again by the bag film (not shown), and vacuum suction is performed.

Subsequently, the core die 10, the laminate 30, and the surface die 20 (partial surface dies 21 to 27) which are integrally fixed by the bag film are put into an autoclave (high temperature and high pressure iron pot) so that heat of high temperature and high pressure are simultaneously applied thereto and thus the laminate is cured. At this time, since the laminate 30 deforms in a state in which the laminate 30 is pressed by the surface die 20, unevenness and undulations existing in the surface of the laminate 30 are removed and thus the laminate 30 is molded to have a smooth surface. The stringer is bonded to the laminate 30 (molded article) through the curing step described above. The outline of the mold 100 according to the present embodiment has been described hereinabove.

<Details of Partial Surface Die>

Next, the partial molds 21 to 27 according to the present embodiment are described in more detail. The partial surface dies 21 to 27 of seven sheets which constitute the surface die 20 have a thickness of about 1.5 mm and are flexible. The partial surface dies 21 to 27 are made of a carbon fiber-reinforced plastic (hereinafter, referred to as "CFRP") in which the quantity of fiber having a grain direction in agreement with the circumferential direction is larger than the quantity of fiber having a grain direction in agreement with the axial direction. Carbon fiber in the CFRP functions to suppress deformation in the grain direction. This applies not only in the case of deformation attributable to an external force but also in the case of deformation attributable to heat. That is, since, as for the carbon fiber, a coefficient of thermal expansion in the grain direction can be controlled, the partial surface dies 21 to 27 according to the present embodiment are formed so that a coefficient of thermal expansion in the circumferential direction is smaller than a coefficient of thermal expansion in the axial direction.

Hereinafter, a method of manufacturing the partial surface dies 21 to 27 according to the present embodiment is described. First, a total of about ten sheets of prepreg are laminated. The ten sheets of prepreg are a proper combination of fiber cross material-reinforced resin prepreg (hereafter, the term "textile material" means this prepreg) and fiber unidirectional material-reinforced resin prepreg (hereinafter, the term "unidirectional material" means this prepreg) which has only one grain direction in agreement with the circumferential direction. In the present embodiment, the fiber in each prepreg is formed of carbon fiber, and the resin is an epoxy resin or a bismaleimide resin. Subsequently, the laminated prepreg is enclosed in a vacuum bag and then vacuum suction is performed. In this state, the laminated prepreg is put under pressure and heat so as to be cured. Then, the cured prepreg (molded article) is taken out of the vacuum bag and is cut into pieces with a predetermined size. Throughout these steps, the partial surface dies 21 to 27 are completed. The number of sheets of the laminated prepreg which is illustrated here is just an example, and is not limited to this example.

In the present embodiment, when the quantity of the fiber having a grain direction in agreement with the axial direction within the textile material is set to 1, the quantity of the fiber having a grain direction in agreement with the circumferential direction within the textile material is 1, the quantity of the fiber having a grain direction in agreement with the circumferential direction within the unidirectional material is 2, and the quantity of the fiber having a grain direction in agreement with the axial direction within the unidirectional material is 0. When this composition is used, in the partial surface dies 21 to 27 manufactured through the above manufacturing method are configured so that a total quantity of the fiber having the grain direction in agreement with the axial direction is 1 and a total quantity of the fiber having the grain direction in agreement with the circumferential direction is 3. In this case, when the coefficient of thermal expansion in the circumferential direction is $2.5 \times 10^{-6}/°$ C. and the coefficient of thermal expansion in the circumferential direction of partial surface dies (conventional example) formed of only a conventional textile material is $5.0 \times 10^{-6}/°$ C., the coefficient of thermal expansion in the circumferential direction of the partial surface dies 21 to 27 manufactured through the above manufacturing method is a value which approximates 2.0 to $2.5 \times 10^{-6}/°$ C. which is the coefficient of thermal expansion in the circumferential direction of the core die 10.

In regard to a partial surface die (reference example) in which the quantity of the fiber having the grain direction in agreement with the axial direction is 1 and the quantity of the fiber having the grain direction in agreement with the circumferential direction is 7, although the coefficient of thermal expansion in the circumferential direction is lowered to $1.5 \times 10^{-6}/°$ C., as the strength in the axial direction is relatively low, this partial surface die easily breaks and thus there are some problems in terms of application. As can be understood from above, when a ratio of the quantity of the fiber having the grain direction in agreement with the circumferential direction to the quantity of the fiber having the grain direction in agreement with the axial direction is increased, the coefficient of thermal expansion in the circumferential direction correspondingly decreases. However, when the ratio of the quantity of the fiber having the grain direction in agreement with the circumferential direction is excessively high, the quantity of the fiber having the grain direction in agreement with the axial direction becomes too small. Accordingly, this is not desirable in terms of application. For this reason, for the CFRP used for the partial surface dies 21 to 27, it is desirable that when the quantity of the fiber having the grain direction in agreement with the axial direction is 1, the quantity of the fiber having the grain direction in agreement with the circumferential direction is 2 to 5. The following table summarizes the contents of the above description.

laminated. And for the remaining half, three more sheets of the unidirectional material are laminated again and finally one sheet of the textile material is laminated. The term "fiber quantity ratio" represents a ratio of the quantity of the fiber having the grain direction in agreement with the circumferential direction and the quantity of the fiber having the grain direction in agreement with the axial direction.

As described above, according to the present embodiment, the coefficient of thermal expansion in the circumferential direction of the partial surface dies 21 to 27 can be adjusted to approximate the coefficient of thermal expansion in the circumferential direction of the core die 10. Therefore, at the time of curing the laminate 30, a difference (position shift) in thermal expansion amount in the circumferential direction between the core die 10 and the partial surface dies 21 to 27 can be suppressed to be a small level. This suppresses wrinkles from occurring around the connecting member 40, or can reduce the size of the wrinkles even if the wrinkles occur. For the fiber-reinforced resin, in order to increase the "strength" in a predetermined direction, a technique of increasing the quantity of fiber in the same direction has been employed from the past. However, in the present embodiment, differently from the conventional technique, a technique of increasing the quantity of fiber in the circumferential direction is employed to lower the "coefficient of thermal expansion" in the circumferential direction. This technique can be employed because in the partial surface dies 21 to 27 of the present embodiment a tolerance level of the thermal expansion in the axial direction is larger than that in the circumferential direction. That is, although the problem of wrinkles arises around the joints of the partial surface dies 21 to 27, since the joints do not exist in the axial direction, the problem of wrinkles may not arise in the axial direction and thus the thermal expansion in the axial direction is permitted to some extent. When the laminate 30 is laminated on the core die 10, the laminate 30 cannot be brought into perfectly tight contact with the core die 10, but

TABLE 1

|  | Conventional example | Embodiment | Reference example | Core die |
|---|---|---|---|---|
| Material | Textile material only | Textile material and unidirectional material | Textile material and unidirectional material | Invar alloy |
| Number of laminated sheets | 10 | 8 | 8 | — |
| Order of lamination | Wholly textile material | [(0.90)/0/(0.90)/0]s | [(0.90)/0/0/0]s | — |
| Fiber quantity ratio | 1:1 | 3:1 | 7:1 | — |
| CTE in circumferential direction [$\times 10^{-6}/°$ C.] | 6.0 | 2.5 | 1.5 | 2.0 to 2.5 |
| CTE in axial direction [$\times 10^{-6}/°$ C.] | 6.0 | 7.5 | 10.0 | 2.0 to 2.5 |
| Applicability | ○ | ○ | Δ | — |

In the column of "order of lamination" in the table, the expression only "0" indicates the unidirectional material in which the grain direction is only the circumferential direction, and the expression of "(0.90)" indicates the textile material. The expression "s" means that a remaining half is laminated in reverse order to the order in which a preceding half is laminated. For example, in the reference example, one sheet of the textile material is laminated first, and then three consecutive sheets of the unidirectional material are is laminated in a slightly swelling state. This also tends to easily produce the wrinkles. However, if the partial surface dies are used, since the swelling amount is not trailed, the swelling amount can be dispersed.

<Arrangement of Partial Surface Die>

Next, arrangement of the partial molds 21 to 27 according to the present embodiment is described. Hereinafter, a molded article (skin panel) according to the present embodiment produced by curing the laminate 30 is described first.

The molded article according to the present embodiment is not uniform in thickness over the entire circumference but varies from position to position in the circumferential direction. The thickness in each position in the circumferential direction is determined based on the required strength in the position. For example, in a portion at which a relatively low strength is required, the thickness is about 2 mm. On the other hand, in a door installation portion at which a high strength is required, the thickness is about 20 mm. Since the molded article is a part of an aircraft, in order to suppress an increase in weight, it is formed so that the thickness may not be increased to a level more than needed. However, even in the case of such a molded article, a portion where a difference between a requisite thickness for a required strength and an actual thickness is relatively large as compared with other portions exists. For example, the requisite thickness may be 20 mm for the required strength in a certain position, and the requisite thickness may be 10 mm for the required strength in another position adjacent to the previously mentioned position. In this case, the boundary between both of the portions is not formed stepwise but formed smoothly with a slope shape. In this case, the portion of a slope shape would be a portion where the actual thickness is relatively large compared with the requisite thickness for the required strength.

In the present embodiment, a value obtained by subtracting the requisite thickness for the required strength from the actual thickness is defined as "strength margin", the joints between the partial surface dies 21 to 27 are arranged in the positions having a large strength margin within the laminate 30. The optimal arrangement of the partial surface dies 21 to 27 varies depending on molded articles. In the present embodiment, the arrangement and sizes of the partial surface dies 21 to 27 are given just as an example.

Hereinafter, the arrangement of the partial surface dies 21 to 27 according to the present embodiment is described with reference to FIG. 2 from viewpoints of a reference position in circumferential direction, a constituent sheet number, and a circumferential size. For the sake of convenience in description, the partial surface dies 21 to 27 shown in FIG. 2 are called a first partial surface die 21, a second partial surface die 22, a third partial surface die 23, a fourth partial surface die 24, a fifth partial surface die 25, a sixth partial surface die 26, and a seventh partial surface die 27 in order in a clockwise direction from the top. A top portion of the laminate 30 in FIG. 2 shall be a top portion of a body of a machine. Hereinafter, the expression "top portion of a laminate" means a portion corresponding to a top portion (top portion of a body of a machine) of the skin panel serving as the molded article.

The reference position in circumferential direction means a position in the circumferential direction which serves as a reference when arranging each of the partial surface dies 21 to 27. In the present embodiment, the top portion of the laminate 30 is used as the reference position in circumferential direction. Specifically, the first partial surface die 21 is arranged in the top portion of the laminate 30 which is the reference position in circumferential direction. The second partial surface die 22 and seventh partial surface die 27, the third partial surface die 23 and sixth partial surface die 26, and the fourth partial surface die 24 and fifth partial surface die 25 are arranged relative to each other, with respect to top portion of the laminate 30 serving as the reference position. Thus, the reason of the configuration in which the top portion of the laminate 30 is used as the reference position in circumferential direction is because the skin panel serving as the molded article has nearly bilateral symmetry and the strength margins are also dispersed bilaterally symmetrically. In the present embodiment, the first partial surface die 21 is arranged to cover the reference position in circumferential direction, but the joint of the first partial surface die 21 and the second partial surface die 22 may be located in the reference position in circumferential direction, for example. The reference position in circumferential direction may not be the top portion of the laminate 30 but be a position where the strength margin of the laminate 30 is the largest. For example, the joint of the first partial surface die 21 and the second partial surface die 22 may be located in the reference position in circumferential direction.

The constituent sheet number is the number of the partial surface dies 21 to 27 which constitute the surface die 20. In the present embodiment, the constituent sheet number is 7. Since the thermal expansion amount in the circumferential direction is constant over the entire area of the surface die 20 regardless of the constituent sheet number, when the number of the partial surface dies 21 to 27 is increased and thus when the number of the joints is increased, the thermal expansion amount per joint decreases. Therefore, when the constituent sheet number is increased, it becomes more difficult for the wrinkles to occur in the laminate 30. However, when the constituent sheet number is excessively increased, the burden of work of attaching the partial surface dies 21 to 27 to the laminate 30 increases and the size in the circumferential direction of the partial surface dies 21 to 27 is excessively decreased. As a result, there is a case where the partial surface dies cannot be attached to the laminate 30 practically. Taking this point into account, when the laminate 30 has a diameter of about 6 m, it is preferred to construct the surface die 20 with 5 to 8 sheets of the partial surface die.

The circumferential size is a size in the circumferential direction of each of the partial surface dies 21 to 27. In the present embodiment, the circumferential size is not uniform. Specifically, the second partial surface die 22 and seventh partial surface die 27 have an equal circumferential size, the third partial surface die 23 and sixth partial surface die 26 have an equal circumferential size, and the fourth partial surface die 24 and fifth partial surface die 25 have an equal circumferential size. However, except for these cases the partial surface dies have different circumferential sizes. In the present embodiment, without regard to the configuration in which the circumferential size of each partial surface die 21 to 27 equals to each other, each partial surface die 21 to 27 is arranged so that the joints between the partial surface dies 21 to 27 can be located in portions where the strength margin is large with high accuracy. However, when the burden of work of installing each partial surface die 21 to 27 is taken into consideration, it is preferable that the circumferential size of each partial surface die 21 to 27 is almost the same (or is in a predetermined range). In the present embodiment, the circumferential size of each of the partial surface dies 21 to 27 is 2.5 to 3.0 m.

The mold 100 according to the present embodiment has been described above. In accordance with the mold 100 according to the present embodiment, since the coefficient of thermal expansion in the circumferential direction of each partial mold 21 to 27 approximates the coefficient of thermal expansion in the circumferential direction of the core die 10, wrinkles hardly occur in the molded article. Even if the wrinkles occur, since the strength margin is large in the position at which the wrinkles occur, influence of the strength reduction of the laminate can be suppressed.

As described above, although the embodiments of the present invention have been described with reference to the drawings, concrete configurations thereof are not limited to the embodiments, and changes in design which are made without departing from the spirit of the present invention will fall within the scope of the present invention. For example, hereinabove, although a case where the partial surface dies 21 to 27 have flexibility is described, even a configuration in which the partial surface die has a fixed shape falls within the scope of the present invention.

INDUSTRIAL APPLICABILITY

According to the present invention, since it is possible to provide a mold in which wrinkles hardly occur when curing a laminate obtained by laminating prepreg, the present invention is useful in the technical field of a mold.

DESCRIPTION OF REFERENCE SIGNS

10: Core die
20: Surface die
21 to 27: Partial surface die
30: Laminate
40: Connecting member
100: Mold

The invention claimed is:

1. A mold used when curing a cylindrical laminate obtained by laminating a prepreg, the mold comprising:
   a core die made of an invar alloy and located inside the laminate; and
   a surface die that is located outside the laminate and includes a plurality of partial surface dies,
   wherein the partial surface dies are arranged in a circumferential direction of the laminate so as to cover an entire circumferential surface of the laminate,
   wherein each of the partial surface dies is formed of a fiber-reinforced resin in which a quantity of fiber having a grain direction in agreement with the circumferential direction differs from a quantity of fiber having a grain direction in agreement with an axial direction,
   wherein each of the partial surface dies is formed by laminating a textile material containing carbon fiber and a unidirectional material containing the carbon fiber,
   wherein a ratio of a quantity of (i) the carbon fiber having a grain direction in agreement with the axial direction within the textile material, (ii) the carbon fiber having a grain direction in agreement with the circumferential direction within the textile material, (iii) the carbon fiber having a grain direction in agreement with the circumferential direction within the unidirectional material and (iv) the carbon fiber having a grain direction in agreement with the axial direction within the unidirectional material is 1:1:2:0, and
   wherein each of the partial surface dies is constructed such that a coefficient of thermal expansion in the circumferential direction is smaller than a coefficient of thermal expansion in the axial direction and more closely approximates a coefficient of thermal expansion of the core die than the coefficient of thermal expansion in the axial direction.

2. The mold according to claim 1, wherein for the laminate, a strength margin obtained by subtracting a requisite thickness for a required strength from an actual thickness varies from position to position in the circumferential direction, and
   each partial surface die is arranged so that a joint between the partial surface dies is located in a position in the circumferential direction within the laminate, the position having a strength margin larger than that of the periphery.

3. The mold according to claim 1, wherein as for the laminate, a strength margin obtained by subtracting a requisite thickness for a required strength from an actual thickness varies from position to position in the circumferential direction, and
   each partial surface die is arranged so that one of joints between the partial surface dies is located in a position in the circumferential direction within the laminate, the position having a largest strength margin.

4. The mold according to claim 2,
   wherein the laminate is formed as a fuselage of an aircraft,
   the surface die includes 5 to 8 sheets of the partial surface die, and
   the partial surface dies may be bilaterally symmetrically arranged with respect to a portion located at a top portion of the fuselage.

5. The mold according to claim 3,
   wherein the laminate is formed as a fuselage of an aircraft,
   the surface die includes 5 to 8 sheets of the partial surface die, and
   the partial surface dies may be bilaterally symmetrically arranged with respect to a portion located at a top portion of the fuselage.

* * * * *